United States Patent
Langford

(10) Patent No.: US 6,397,439 B1
(45) Date of Patent: Jun. 4, 2002

(54) HOLDING DEVICE

(76) Inventor: Ivor Barrie Langford, South Lodge, Hints Court, Hints, Tamworth, Staffordshire (GB)

( * ) Notice: Subject to any disclaimer, the term of this patent is extended or adjusted under 35 U.S.C. 154(b) by 0 days.

(21) Appl. No.: 09/463,672

(22) PCT Filed: Apr. 7, 1998

(86) PCT No.: PCT/GB98/01023

§ 371 (c)(1), (2), (4) Date: Mar. 20, 2000

(87) PCT Pub. No.: WO99/06626

PCT Pub. Date: Feb. 11, 1999

(30) Foreign Application Priority Data

Jul. 30, 1997 (GB) .............................................. 9715968

(51) Int. Cl.⁷ .......................... A44B 21/00; D06F 55/02; E05D 7/00
(52) U.S. Cl. ............................ 24/518; 24/499; 24/511; 24/557
(58) Field of Search .......................... 24/518, 557, 511, 24/500, 487, 489, 499

(56) References Cited

U.S. PATENT DOCUMENTS

| | | | |
|---|---|---|---|
| 3,616,497 A | * 11/1971 | Esposito, Jr. | ................. 24/557 |
| 4,040,697 A | 8/1977 | Ramsay et al. | |
| 4,514,885 A | * 5/1985 | Delahousse et al. | .......... 24/557 |
| 4,839,947 A | * 6/1989 | Cohen et al. | .................. 24/557 |
| 5,179,768 A | 1/1993 | Jio | |
| 5,301,393 A | * 4/1994 | Brown | ......................... 24/511 |
| 5,325,570 A | 7/1994 | Chin-Ho | |
| 5,452,500 A | * 9/1995 | Revis | ............................ 24/557 |
| 5,640,742 A | 6/1997 | White et al. | |

FOREIGN PATENT DOCUMENTS

| | | | |
|---|---|---|---|
| EP | 0 228 325 A | 7/1989 | |
| FR | 0074507 | * 12/1960 | .................. 24/557 |
| FR | 2360706 | * 4/1978 | .................. 24/499 |
| GB | 798 846 A | 6/1958 | |
| GB | 1 503 927 A | 3/1978 | |

* cited by examiner

Primary Examiner—Victor N. Sakran
(74) Attorney, Agent, or Firm—Marshall, Gerstein, & Borun

(57) ABSTRACT

A holding device comprising two clamping members (10, 11); a hinge portion (16); and a spring element (24); wherein all the aforesaid parts are integrally molded from a plastics material and the spring element is connected to one of said clamping members by a mounting portion (25) of sufficiently small cross section to enable the spring element to be molded in a position in which apart from said mounting portion it is clear of said clamping members (10, 11), and thereafter can be moved about said mounting portion (25) to an operative position in which it spring biases the clamping members (10, 11) relative to one another.

19 Claims, 2 Drawing Sheets

HOLDING DEVICE

DESCRIPTION OF INVENTION

This invention relates to a holding device. The invention has been devised in relation to clothes pegs, although it is to be appreciated that the invention is more widely applicable to holding devices for other purposes, as described hereafter.

Clothes pegs are known which comprise two clamping members pivotally connected to one another and with a spring operable therebetween so as to cause jaw portions of the clamping members to be urged towards one another, for holding a textile article such as an item of clothing to a clothes line by clamping a part of the article and clothes line therebetween. Conventionally, the clamping members have handle portions which extend beyond the pivotal connection of the clamping members to one another so that by gripping the handle portions and displacing them towards one another the jaw portions are moved away from one another to release an article from being held therebetween. Commonly the clamping members are of a plastics material or wood, and both the connection to one another and the spring action are provided by a metal spring which engages them. Such clothes pegs have the disadvantage of comprising separate components which have to be assembled relative to one another, making them expensive to manufacture.

A further known type of clothes peg is integrally moulded from a plastics material of suitably tough and resilient properties, and relies on the resilience of the material to exert sufficient force between jaw portions to be able satisfactorily to hold an article therebetween. While this type of peg can be economically manufactured, it has a disadvantage in that the techniques characteristically used in manufacture thereof, by injection moulding of the plastics material, require a certain space to be provided between the jaw portions. The result is that such a clothes peg cannot satisfactorily hold an article whose size is less than the space between the jaw portions. Further, the possibly movement of the jaw portions away from one another for holding a large article therebetween is limited.

It has been proposed, in EP-0228325-A, that a clothes peg may be integrally moulded from a plastics material and comprise two clamping members each with a jaw portion and a handle portion, pivotally secured to one another by an integral hinge portion. A springing action between the clamping members is provided by spring tongues cut out of the handle portions of the clamping members and bent back to operative positions in which they bear against one another. Again, this peg requires expensive manufacturing operations in addition to the injection moulding of its basic structure.

Further embodiments of clothes peg are disclosed in GB-796846-A, wherein two inter-connected beams or clamping members of plastics material are pivotably secured to one another by an integral hinge portion, while a springing action is provided by at least one auxiliary resilient member which is moulded in one piece with at least one of the beams and is bent to a pre-stressed position in which it presses against the other beam, to supplement the action of the integral hinge bridge. However, the configuration of the integral resilient members is such that they are not readily displaced to their pre-stressed positions. Thus the disclosed pegs are difficult to manufacture and do not have a satisfactory springing action.

Accordingly it is the object of the present invention to provide an improved holding device such as a clothes peg, integrally moulded from a plastics material but wherein the above described disadvantages of previously known holding devices are overcome or reduced.

According to the present invention, I provide a holding device comprising two clamping members; a hinge portion; and a spring element; wherein all the aforesaid parts are integrally moulded from a plastics material and the spring element is connected to one of said clamping members by a mounting portion of sufficiently small cross-section to enable the spring element to be moulded in a position in which apart from said mounting portion it is clear of said clamping members, and thereafter can be moved about said mounting portion to an operative position in which it spring biases the clamping members relative to one another.

In a holding device in accordance with the invention, following manufacture of the device by, preferably, an injection moulding process and removal of the device from the moulding tool, the only further manufacturing operation required is to displace the spring element by pivotal movement about its mounting portion from its as-moulded position to its operative position in which it is able to operate as a spring between the clamping members. No cutting, piercing or like operations are required, and the movement of the spring element to its operative position is facilitated by the reduced cross-sectional dimension of the mounting portion, i.e. the configuration of the mounting portion as a so-called "living hinge".

The displacement of the spring element from its initial, as moulded, position to its operative position may be carried out by automatic machinery or may be carried out manually, e.g. in the course of a packing operation.

Preferably each of the clamping members of a device in accordance with the invention is of elongate configuration, comprising a jaw portion and a handle portion, with the hinge portion joining the two clamping members generally in the mid-region thereof between each jaw portion and handle portion. The spring portion is connected, preferably, to one of said handle portions by its mounting portion at a position remote from the hinge portion.

Preferably the spring element engages the handle portion of the clamping member (other than that to which the spring element is integrally attached by its mounting portion), at a position remote from the hinge portion. The spring element may comprise an engagement portion which is arranged to engage the handle portion of said other clamping member and to retain its position relative thereto in use of the holding device.

Such an engagement portion may be flat, adapted to lie in face-to-face relationship with a complementary substantially flat portion of said other handle portion. Alternatively, or in addition, the engagement portion of the spring element may cooperate with a formation on the other clamping member to hold the spring element in its operative position relative thereto. Preferably such a formation is constituted by a notch or recess formation in the handle portion, engagable by an end portion of the spring element and arranged such that force exerted by the spring element in use urges said end portion into the notch or recess formation.

The spring element and the clamping member to which it is integrally connected by the mounting portion may also have formations which cooperate to hold the spring element in position relative to the clamping member if the mounting portion should for any reason fail.

It would also be within the scope of the invention if some other joining technique, e.g. welding such as ultrasonic welding, were to be utilised to hold the spring element in its operative position relative to one or both of the clamping members after it has been moved into its operative position relative thereto.

There may be stop means for limiting pivotal movement of the clamping members relative to one another in the sense of moving the jaw portions thereof away from one another beyond a predetermined limiting position. Such stop means may be afforded by an abutment which may be on the spring element.

A preferred form of spring element in accordance with the invention is that of a generally V-shaped element, possibly with the two limbs of the V-shaped element being curved so as to diverge increasingly from one another with increasing distance from where they are connected to one another. In this case, a free end of one limb is connected to one of the clamping members by the mounting portion while the free end of the other limb engages the other clamping member when the spring element is in its operative position, while the connection between the limbs of the spring element lies adjacent the hinge portion of the device.

Although, as referred to above, the invention is primarily applicable to a holding device which is a clothes peg, it is applicable to other holding devices of similar or analogous configuration. For example, clamping devices generally may be made in accordance with the invention. One such clamping device to which the invention is applicable is the so-called "crocodile clip" which is used for establishing a temporary electrical connection with an electrical component or device. In this case, the device is required to be provided with a metallic or other electrically conductive element or elements for establishing the electrical connection, e.g. in the jaw portions of the clamping members.

A particular example of such use of a device in accordance with the invention is in the heavy duty connection clips such as are used for connection to the battery terminals in a motor vehicle by jump leads when "jump starting" a vehicle whose battery is discharged. The invention enables sufficient force to be applied by the clip to ensure satisfactory electrical connection, but since the clip in accordance with the invention is primarily of plastics material it is unnecessary to provide an additional insulating covering such as is required with metal clips.

The invention will now be described by way of example with reference to the accompanying drawings, of which:-

Figure 1:
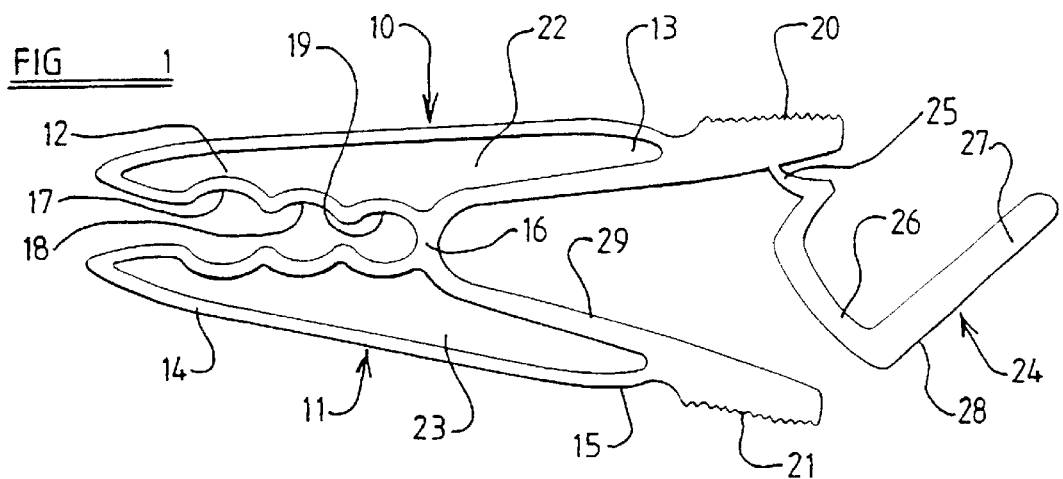
FIG. 1 is an elevation of a first embodiment of holding device in accordance with the invention, in the form of a clothes peg, in a first position in which it has been manufactured.
Figure 2:
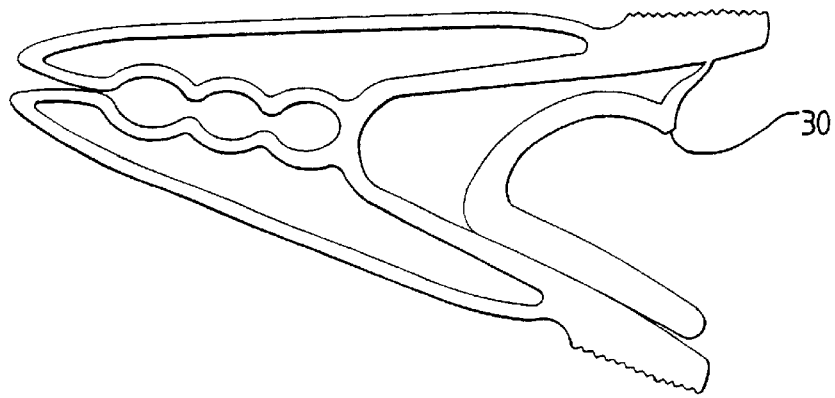
FIG. 2 shows the clothes peg of FIG. 1 in an operative position.

Referring firstly to FIGS. 1 and 2 of the drawings, these show a holding device which is in the form of a clothes peg. It comprises two clamping members 10, 11 of which the clamping member 10 has a jaw portion 12 and a handle portion 13, while the clamping member 11 has a jaw portion 14 and a handle portion 15. The clamping members 10, 11 are joined to one another by a hinge portion 16. The jaw portion 12 of the clamping member 10 comprises three successive arcuate formations 17, 18, 19 as the hinge portion 16 is approached and the jaw portion 14 of the clamping member 11 is provided with complementary arcuate formations, not referenced, to provide a total of three holding formations for holding articles of different sizes between the jaw portions. At the ends of the handle portions 13, 15 remote from the hinge portion 16 there are finger-grip portions 20, 21 respectively, which are serrated to assist non-slip gripping and squeezing together thereof by the fingers of a user.

The entire clothes peg as thus described is a one-piece integral component of a tough and resilient plastics material such as polypropylene or polyamide (e.g. "nylon" of suitable grade). It is made as an injection moulding, in known manner, in a die having two die halves movable towards and away from one another in a direction perpendicular to the plane of the drawing. It will be noted that over the majority of their length the clamping members have relatively thin central web portions 22, 23, to minimise the amount of material used whilst not detracting from the strength of the clothes peg. The hinge portion 16 is sufficiently thin to permit pivotal movement of the two clamping members relative to one another about an axis perpendicular to the plane of the drawing in the region of the centre of the hinge portion.

Adjacent the free end of the handle portion 13 of the clamping member 10, and beneath the grip portion 20 thereof, there is a spring element indicated generally at 24. This is connected to the handle portion 13 by a mounting portion 25 which is sufficiently thin to enable the spring portion 24 as a whole to be pivoted relative to the handle portion 13, followed by a spring portion 26 and an engagement portion 27. The spring portion 26 is somewhat arcuate in configuration, while the engagement portion 27 has a flat face 28.

FIG. 1 shows the clothes peg in the configuration in which it is manufactured by the injection moulding process and in which it is removed from the die. The illustrated position of the jaw portions 12, 14 of the clamping members relative to one another allow sufficient space therebetween for the formations 17, 18, 19 to be accurately moulded, whilst the position of the spring element 24 away from the handle portion 15 of the clamping member 11 also enables accurate moulding of the spring element. After having been removed from the die, the spring element 24 is pivoted about its mounting portion 25 until the surface 28 of the engagement portion 27 lies in face-to-face engagement with facing surface 29 of the handle portion 15. The geometry of the spring element and its position of connection to handle portion 13 is such that this position is reached by an over-centre action, so that when the engagement portion 27 has its surface 28 in face-to-face engagement with surface 29, such position is retained. Then the spring portion 26 biases the handle portions 13, 15 away from one another and thus the jaw portions 12, 14 pivotally towards one another for holding an article or articles therebetween. Between the mounting portion 25 and spring portion 26, there is an abutment formation 30, arranged to abut the engagement portion 27 to act as stop means to limit pivotal movement of the handle portions 13, 15 towards one another and thus to limit opening of the jaw portions 12, 14.

Figure 3:
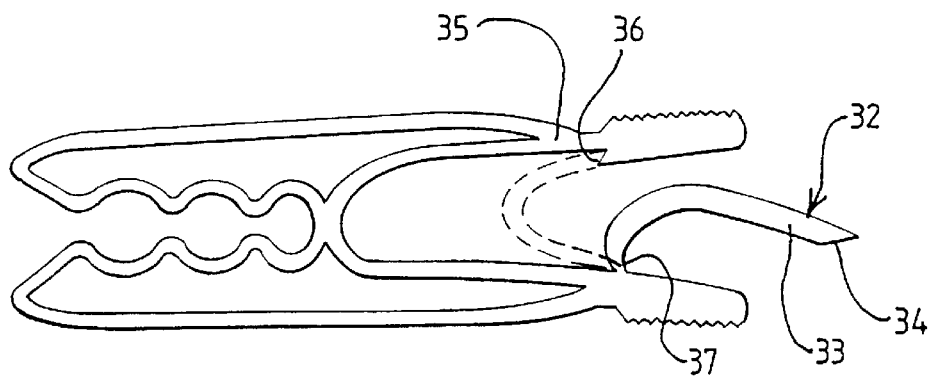
FIG. 3 is a view of a further embodiment of clothes peg in accordance with the invention.

Referring now to FIG. 3 of the drawings, this shows a further embodiment of clothes peg in accordance with the invention, whose principal features are as described above and thus will not be described again. It differs from the embodiment of FIG. 2 in respect of the configuration of the spring element thereof, indicated at 32, which instead of having an engagement portion as 27 has an end portion 33 with a chamfered end 34. The handle portion (35) of the peg to which the spring element 32 is not attached has a notch or recess formation 36 with which the chamfered end 34 is engagable to hold the spring element 32 in its operative position (shown in broken lines in FIG. 3) to which it has been moved from its as-moulded position in which it is shown in full lines. The spring element 32 has a mounting portion 37 of small cross-sectional dimension, to provide a "living hinge" permitting easy displacement of the spring element to its operative position.

Figure 4:
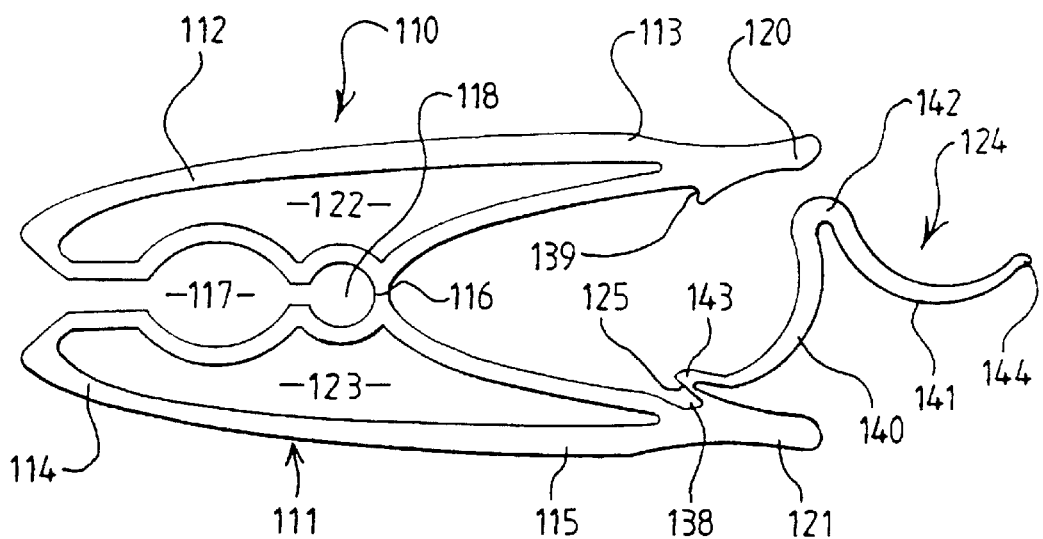
FIG. 4 is a view as FIG. 1 of yet a further embodiment of clothes peg in accordance with the invention, in its as-moulded condition.
Figure 5:
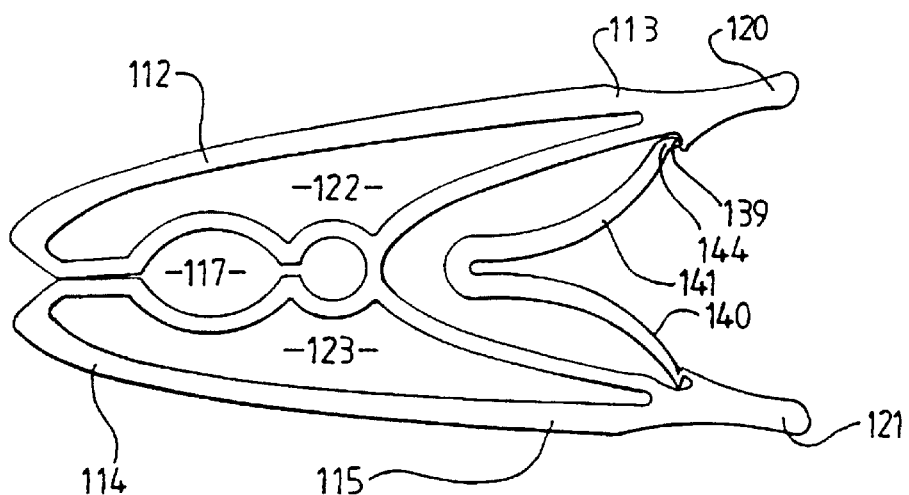
FIG. 5 is a view as FIG. 4, but with the clothes peg in its operative condition.

Referring now to FIGS. 4 and 5 of the drawings, these show a further embodiment of clothes peg in accordance with the invention. Like the embodiments described above, the peg comprises two clamping members 110, 111 with jaw portions 112, 114 and handle portions 113, 115. There is a hinge portion 116. The jaw portions define two holding formations 117, 118 for holding articles of different sizes, and the handle portions have respective concave finger grip portions 120, 121. Further, as above described, the clamping members comprise peripherally extending flange portions with relatively thin central web portions 122, 123.

The clamping member 111 has a spring element indicated generally at 124 integral therewith, being connected to the clamping member by a mounting portion 125 of sufficiently thin cross-sectional dimension to constitute a "living hinge". Adjacent the mounting portion 125, the clamping member 111 has a recess formation 138 which faces the hinge portion 116, while opposite the recess formation 138 the clamping member 110 has a recess formation 139 which similarly faces towards the hinge portion 116.

The configuration of the spring element 124 is generally of V-shape, with two limbs 140, 141 which are curved so as to be increasingly inclined away from one another as they extend away from a region 142 of U-shape where they are joined. The limb 140 ends at an edge 143 adjacent the mounting portion 125, while the free end of the limb 141 is indicated at 144.

The peg is preferably made as an injection moulding from a plastics material such as above described. As moulded, the spring element 124 is in the position shown in FIG. 4 in which it is, apart from its connection to the clamping member 111 by the mounting portion 125, clear of the clamping members.

FIG. 5 shows the clothes peg of FIG. 4 in its usable condition, in which the spring element 124 has been displaced by pivoting it about its mounting portion 125 relative to the clamping member 111. In its operative position, the end 144 of the limb 141 engages in the recess 139 of the clamping member 110, while the formation 143 at the end of the limb 140 of the clamping member is disposed at least partially in the recess 138 of the clamping member 111. The part 142 of the spring element lies adjacent the hinge portion 116, and the limbs 140, 141 are considerably straightened out compared with their as-moulded condition. Thus the spring element biases the handle portions 113, 115 of the clamping members away from one another, and hence the jaw portions thereof towards one another for holding an article or articles between the jaw portions.

In the clothes peg of FIGS. 4 and 5, the provision of the formations 138, 143 adjacent the mounting portion 125 has the effect that even if the mounting portion 125 should fail the spring element is still retained in its operative position in the clothes peg. Such failure might occur in the course of displacement of the spring element to its operative position, or after prolonged use since the configuration of the spring element and mounting portion is such that some bending of the mounting portion will occur as the peg is operated.

It is within the broad scope of the invention if, after displacement of the spring element to its operative position, some fastening or securing technique were to be utilised between the spring element and clamping members to hold the spring element in its operative position. Such a fastening technique might be welding, e.g. ultrasonic welding. Retention of the spring element in its operative position is thus assured.

Thus the invention provides a holding device which can be readily manufactured as an integral moulding of a plastics material, with a spring means which can readily be brought into an operative position after the device has been moulded. The holding device may be a clothes peg as above described, but it is to be appreciated that other holding devices of similar or analogous construction or intended use can be provided in accordance with the invention. One particular example of such another holding device is a clip for establishing an electrical connection, e.g. a clip which is intended to establish an electrical connection with a terminal of a battery in a motor vehicle, for the purpose of starting the vehicle by means of "jump leads" if the vehicle's battery is discharged. A further example of a clip for establishing an electrical connection is one for use in electric welding, to connect to a workpiece. A clip for this purpose would, of course, be somewhat larger than a clothes peg, and for establishing the electrical connection would have a holding formation provided with an electrically-conductive element or elements to which connection can be made by a heavy duty electrical cable. Such an electrically-conductive element may, for example, comprise a copper element secured to the plastics device in the course of the injection moulding process. Such a clip has the advantage of not requiring to be separately provided with an insulating covering to protect parts of it other than its holding formation.

Yet further examples of holding devices which may be made in accordance with the present invention are clips of the kind which are used in surgical procedures for various purposes. There are many different configurations of such clips for specific uses, and if made in accordance with the invention they may be disposable "use once" items supplied in a sterile condition and discarded when used.

Yet a further possibility of construction of holding devices in accordance with the invention is that reinforcement elements of metal or other materials may be incorporated in or attached to the devices. For example, elements of reinforcing material pivoted together could be provided on the clamping members in the vicinity of the hinge portion, for reinforcing the hinge portion. A fibre-filled plastics material could be utilised for the device as a whole.

The features disclosed in the foregoing description, or the following claims, or the accompanying drawings, expressed in their specific forms or in terms of a means for performing the disclosed function, or a method or process for attaining the disclosed result, as appropriate, may, separately or in any combination of such features, be utilised for realising the invention in diverse forms thereof.

What is claimed is:

1. A holding device comprising:
   a first clamping member and a second clamping member, each clamping member comprising a jaw portion and a handle portion;
   a hinge portion joining the two clamping members generally in the mid-region thereof between the jaw portion and handle portion of each of the clamping members;

a spring element;

each of the clamping members, the hinge portion, and the spring element being integrally molded from a plastics material; and a living hinge mounting portion having a small cross-section connecting the spring element to handle portion of one of the first and second clamping members;

the spring element having been molded in a position in which, except for the mounting portion, the spring element is clear of the clamping members, the spring element being movable about the mounting portion to an operative position wherein the spring element engages both of the first and second clamping members to provide a spring biasing force therebetween, the spring element further comprising a spring portion and a engagement portion, the engagement portion engaging the handle portion of the other one of the first and second clamping members whereby the spring element is held in the operative position.

2. A holding device according to claim 1 wherein said engagement portion is flat, to lie in face-to-face relationship with a complementary substantially flat face of said other handle portion.

3. A holding device according to claim 1 wherein the engagement portion of the spring element cooperates with a formation on the other one of the first and second clamping members to hold the spring element in the operative position.

4. A holding device according to claim 3 wherein said formation comprises a recess formation in the handle portion of said other clamping member, engagable by an end portion of the spring element under force exerted by the spring element in use.

5. A holding device according to claim 1 wherein the spring element and the clamping member to which it is integrally connected comprise formations arranged to cooperate to hold the spring element in position relative to the clamping member if the mounting portion should fail.

6. A holding device according to claim 1 comprising stop means for preventing pivotal movement of the clamping members relative to one another beyond a predetermined limiting position.

7. A holding device according to claim 6 wherein said stop means comprises an abutment formation on the spring element.

8. A holding device according to claim 1, which is a clothes peg.

9. A holding device according to claim 1 further characterised in that said spring biasing force exerted by the spring element is derived from resilient deformation of the spring element when in the operative position as compared with when it is in its moulded position, and that none or substantially none of said spring biasing force results from deformation of said mounting portion (25; 125).

10. A holding device according to claim 1 wherein said spring element (124) is generally U-shaped comprising limbs (140, 141) extending from a joining region (142), said joining region lying adjacent the hinge portion (116) of the device when the spring element is in the operative position and said limbs extending to engage the clamping members (110, 111) at positions spaced from said hinge portion.

11. A holding device comprising two clamping members (10, 11; 110, 111); a hinge portion (16; 116); and a spring element (24; 32; 124); wherein all the aforesaid parts of the device are integrally moulded from a plastics material and the spring element is connected to one of said clamping members and has been moulded in a position in which apart from said connection it is clear of said clamping members and thereafter has been moved about said connection to an operative position in which it engages both said clamping members to provide a spring biasing force therebetween; characterised in that said connection is afforded by a living hinge mounting portion (25; 125) of small cross-section to enable the spring element readily to be moved from its moulded position to its operative position.

12. A holding device according to claim 11 wherein each clamping member is of elongate configuration comprising a jaw portion and a handle portion, with the hinge portion joining the two clamping members generally in the mid-region thereof between each jaw portion and handle portion.

13. A holding device according to claim 12 wherein the spring portion of connected to one of said handle portions at a position remote from the hinge portion.

14. A holding device according to claim 11, which is an electrical connection clip.

15. A holding device according to claim 14, comprising at least one electrically conductive element in a jaw portion of a clamping member.

16. A method of manufacturing a holding device according to claim 11, comprising moulding the device with said spring element thereof in said position in which it is clear of said clamping members, and, after removal of the device from a mould, displacing the spring element to said operative position.

17. A method according to claim 16 further comprising applying a joining technique between the spring element and at least one clamping member after displacing the spring element to its operative position.

18. A holding device comprising:

a first clamping member and a second clamping member, each clamping member comprising a jaw portion and a handle portion;

a hinge portion joining the clamping members;

a spring element;

each of the clamping members, the hinge portion, and the spring element being integrally molded from a plastics material; and a living hinge mounting portion having a small cross-section connecting the spring element to one of the first and second clamping members;

the spring element having been molded in a position in which apart from the mounting portion the spring element is clear of the clamping members, the spring element moveable about the mounting portion to an operative position wherein the spring element engages both of the first and second clamping members to provide a spring biasing force therebetween.

19. A holding device according to claim 18, wherein the spring element exerts a biasing force derived from resilient deformation of the spring element when the spring element is in the operative position, and further wherein the mounting portion is sized so that the mounting portion exerts substantially no biasing force on the spring element.

* * * * *